(12) United States Patent
Kohout et al.

(10) Patent No.: US 8,246,111 B2
(45) Date of Patent: Aug. 21, 2012

(54) WIND DEFLECTOR

(75) Inventors: Erwin Kohout, München (DE); Robert Birndorfer, Weilheim (DE); Norbert Elbs, München (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 13/142,032

(22) PCT Filed: Nov. 9, 2009

(86) PCT No.: PCT/DE2009/001586
§ 371 (c)(1),
(2), (4) Date: Aug. 1, 2011

(87) PCT Pub. No.: WO2010/083789
PCT Pub. Date: Jul. 29, 2010

(65) Prior Publication Data
US 2011/0285180 A1 Nov. 24, 2011

(30) Foreign Application Priority Data

Jan. 21, 2009 (DE) .................. 10 2009 005 442

(51) Int. Cl.
*B60J 7/22* (2006.01)
(52) U.S. Cl. .......................................... 296/217
(58) Field of Classification Search ................... 296/217
See application file for complete search history.

(56) References Cited

FOREIGN PATENT DOCUMENTS

| DE | 4417049 C1 | 6/1995 |
|---|---|---|
| DE | 202006002018 U1 | 8/2006 |
| DE | 102005033431 A1 | 2/2007 |
| DE | 102008009140 B3 | 7/2009 |
| EP | 0196684 A1 | 10/1986 |
| EP | 1193094 A2 | 4/2002 |
| EP | 1745965 A2 | 1/2007 |

OTHER PUBLICATIONS

International Search Report dated Feb. 2, 2010.

*Primary Examiner* — Dennis Pedder
(74) *Attorney, Agent, or Firm* — Fitch, Even, Tabin & Flannery LLP

(57) ABSTRACT

The invention relates to a wind deflector for a roof opening, which can be closed and opened, in a roof panel of a vehicle. According to the invention it is contemplated that an elastic element, which is fixed with respect to the frame of the roof opening, engages on the wind deflector arm and applies a force thereon in of the longitudinal direction, and an arm, which at one end is connected to the wind deflector arm rotatably about the transverse direction, is mounted at the other end rotatably with respect to the frame of the roof opening in of the transverse direction. The invention further relates to a method for actuating a wind deflector.

8 Claims, 4 Drawing Sheets

STATE OF THE ART

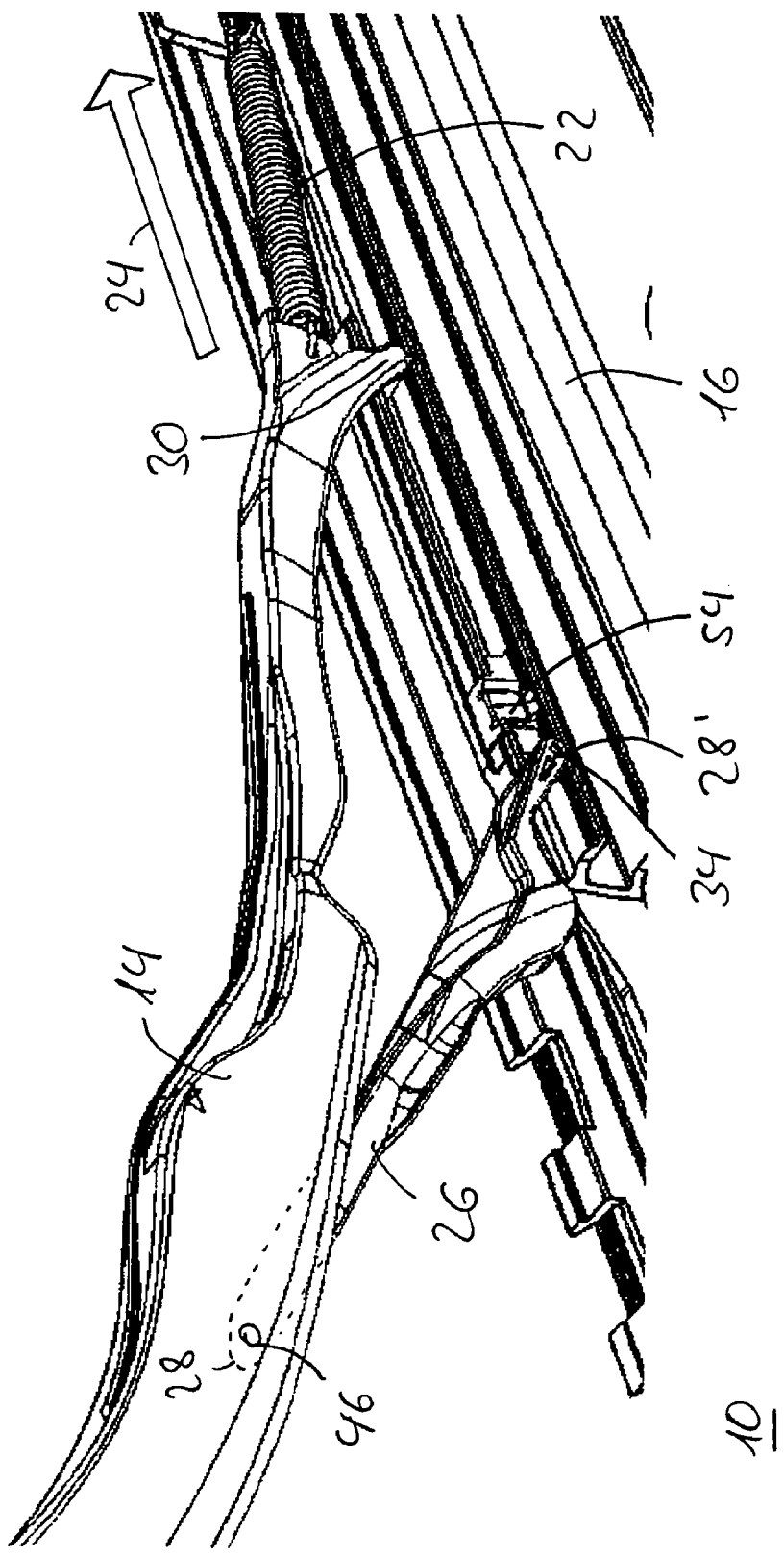

WIND DEFLECTOR

CROSS-REFERENCE TO RELATED APPLICATIONS

This Application is a U.S. national phase application filed under 35 U.S.C. §371 of International Application No. PCT/DE2009/001586, filed Nov. 9, 2009, designating the United States, which claims priority from German Patent Application No. DE 10 2009 005 442.1, filed Jan. 21, 2009, which are hereby incorporated herein by reference in their entirety for all purposes.

The invention relates to a wind deflector for a roof opening which is closable and openable by a cover in a roof panel of a vehicle comprising a wind deflector arm which is mounted movable relative to a frame of the roof opening in a longitudinal direction and rotatable in a transverse direction.

The invention further relates to a method for actuating a wind deflector for a roof opening which is closable and openable by a cover in a roof panel of a vehicle, the deflector comprising a wind deflector arm which is mounted movable relative to a frame of the roof opening in of a longitudinal direction and rotatable in a transverse direction.

Wind deflectors are popular devices used, for example, in convertibles and other vehicles having a sliding roof. Here, the purpose of the wind deflector is to prevent or at least reduce the development of turbulences at the edge of an opening leading into the vehicle in order to reduce noise and air flows caused by the turbulence inside the vehicle, as these substantially affect driving comfort. Conventional wind deflectors as presently used are, for example, illustrated in FIGS. 1 and 2.

FIG. 1 shows a conventional wind deflector 10 in its rest position, and FIG. 2 shows the same wind deflector 10 in its active position, i.e., in its opened state. The wind deflector 10 illustrated in FIGS. 1 and 2 comprises a wind deflector arm 14 mounted in a bearing 50 that is movable in a longitudinal direction 18 and, at the same time, rotatable in a transverse direction 20 perpendicular to the longitudinal direction 18 by said bearing 50. Further, a spring element 48 is provided, which, similar to the bearing 50, is fixed relative to a frame 16 comprising a roof opening 12. For better visibility of the spring element 48 and bearing 50, the frame 16 is not fully shown. Further, only a section of the wind deflector 10 is shown in FIGS. 1 and 2, namely the left side (in the driving direction of the vehicle), including the bearing 50 and spring element 48. Generally, another bearing and spring element exist on the other side of the wind deflector 10 (not shown). The complete wind deflector 10 then comprises one side of the roof opening 12. Perpendicular to the longitudinal direction 18 and transverse direction 20, a reset force 52 acts on the wind deflector arm 14 (from the top in the image direction of FIG. 1) and holds it in its rest position, i.e., essentially in the plane of the frame 16 or the roof opening 12. The reset force 52 may, for example, be generated by a cover (not shown) which closes the roof opening 12. When the roof opening 12 is opened, the reset force 52 decreases, and the illustrated wind deflector 10 is automatically moved into the active position shown in FIG. 2 by the spring element 48. In the process, the spring element 48, which is a torsion spring and fixed relative to the frame 16, applies a force parallel to the longitudinal direction 18 as a result of its stored spring force. This force shifts the wind deflector arm 14 in the bearing 50 in the longitudinal direction 18 via an arm 26. At the same time, the wind deflector arm 14 is rotated in the transverse direction 20, the rotation axis determined by the bearing 50. In the process, the wind deflector arm 14 is raised beyond the level of the frame 16 (upwards in the image direction of FIG. 2) against the reset force 52 acting on it. At the same time, a draught shield (not shown), which is fixed to the frame 16 and the wind deflector 14, is raised in the resulting space. The draught shield suppresses the development of turbulences at the edge of the roof opening 12.

A drawback of this construction is the high spring force acting on the wind deflector arm 14 due to the spring element 48, particularly in and near the rest position of the wind deflector arm 14. Namely, the reset force 52 needed to move the wind deflector 10 from its active position shown in FIG. 2 increases in the transverse direction 20 of the wind deflector arm 14 when approaching the rest position of the wind deflector arm 14, due to the rotation axis being shiftable along the longitudinal axis 18. In the rest position, the entire force applied by the spring element 48 must be compensated by the reset force 52. However, this is cumbersome in the realisation of clamping protection, in particular for operator protection, since the forces to be applied increase when moving the wind deflector 10 into its rest position, i.e., when closing the roof opening 12. This might be erroneously identified as an object stuck between the wind deflector arm 14 and the frame 16. Further, the positioning height of the wind deflector arm 14 in its active position, i.e., the height to which the wind deflector arm 14 protrudes beyond the frame 16 (upwards in the image direction of FIG. 2), is limited by the spring force provided by the spring element 48.

Therefore, the present invention is based on the object to provide a wind deflector at least partly solving the problem described above.

Said object is solved by the feature of the independent claims.

Advantageous embodiments and further developments of the invention are described in the dependent claims.

The invention is based on the generic wind deflector in that an elastic element fixed relative to the frame of the roof opening engages an wind deflector arm and applies a force thereon in the longitudinal direction, and that the end of an arm is connected roteable about the transverse direction to the wind deflector arm, and an other end is mounted rotatable in the transverse direction relative to the frame of the roof opening. By providing an elastic element which applies a force in the longitudinal direction on the wind deflector arm, the required reset force for the arm is reduced considerably, particularly in the rest position. The detection of something being caught is thus eased due to the lower reset force required to act on the wind deflector arm perpendicular to both the longitudinal and transverse directions. In addition, the reachable positioning height of the wind deflector arm is no longer limited by the provided spring force.

Usefully, it may here be contemplated that the wind deflector arm is guided in the longitudinal direction by a pin in a slotted link. In this way, the bearing of the wind deflector arm can simultaneously realise the relocatability in the longitudinal direction and the rotatability in the transverse direction defined by the pin. However, it is also feasible that the pin is guided in the slotted link without being rotatable and that a separate rotatable bearing of the wind deflector arm is provided in the vicinity of the pin.

It may be contemplated that the arm is mounted movable relative to the frame also in the longitudinal direction. With additional movability of the arm in the longitudinal direction, it is, for example, possible to move the entire wind deflector under the frame after it has reached its rest position in order to position it invisibly in its rest position.

It may further be contemplated that the arm is guided in the longitudinal direction by a further pin in a further slotted link.

In this way, it is possible to convert the force acting on the wind deflector arm in the longitudinal direction into a rotational force capable of raising the wind deflector arm. Here, the power conversion may, for example, be realised by guiding the arm in the slotted link perpendicular to the plane defined by the longitudinal and transverse directions or by the arm abutting a protrusion during its movement in the slotted link and being raised by said protrusion during its movement in the longitudinal direction.

Advantageously, it may be contemplated that the further slotted link is identical to the slotted link. This renders a simplified production possible, wherein a potentially necessary stopper for the arm may be located in the slotted link so as to divide it into two sections.

Preferably, it may be contemplated that the elastic element is a tension spring. With a tension spring, a required force in the longitudinal direction can be applied to the wind deflector arm by use of a simple design.

It is particularly preferred that the arm is rigid. In this way, the rotational force required for raising the wind deflector arm can be realised in a defined way.

Alternatively, it may also be contemplated that the arm is a spring element. The rotational force required for raising the wind deflector arm is, in this case, supported by the spring element which may, for example, be realised in the form of the torsion spring known from FIGS. 1 and 2.

It is also possible that a further elastic element is provided which only contacts the wind deflector in a rest position and, at that time, exerts a further force on the wind deflector. Due to the small reset force required in the rest position of the wind deflector arm, oscillation of the wind deflector may result while the vehicle is driven with the roof opening closed or with the wind deflector in the rest position. The oscillation could manifest itself, for example, as undesired noise generation, for example, in the form of rattling the wind deflector arm against the frame. The further elastic element prevents undesired noise generation by restraining the wind deflector arm in its rest position against the reset force by means of the further elastic element.

The generic method for actuating a wind deflector is further developed according to the invention in that a continuous force is applied to the wind deflector arm in the longitudinal direction, the force acting on the wind deflector arm in the longitudinal direction is converted into a rotational force directed in the rotating direction of the wind deflector arm about the transverse direction, and the wind deflector arm being moved from a rest position to a work position by the rotational force directed in the rotating direction. In this way, the advantages and distinctive features of the wind deflector according to the invention are also realised within the framework of a method. This also applies to the subsequently described, particularly preferred embodiment of the method according to the invention.

Usefully, it is further developed by an additional force in the rotating direction acting on the wind deflector arm is generated by a spring element fixed between the wind deflector arm and the frame.

The invention will now be explained by way of example with reference to the accompanying drawings on the basis of a preferred embodiment.

FIG. 4 shows a side view of a part of a wind deflector according to the invention in its active position.

In the following drawings, identical numerals designate the same or similar parts.

Figure 1:
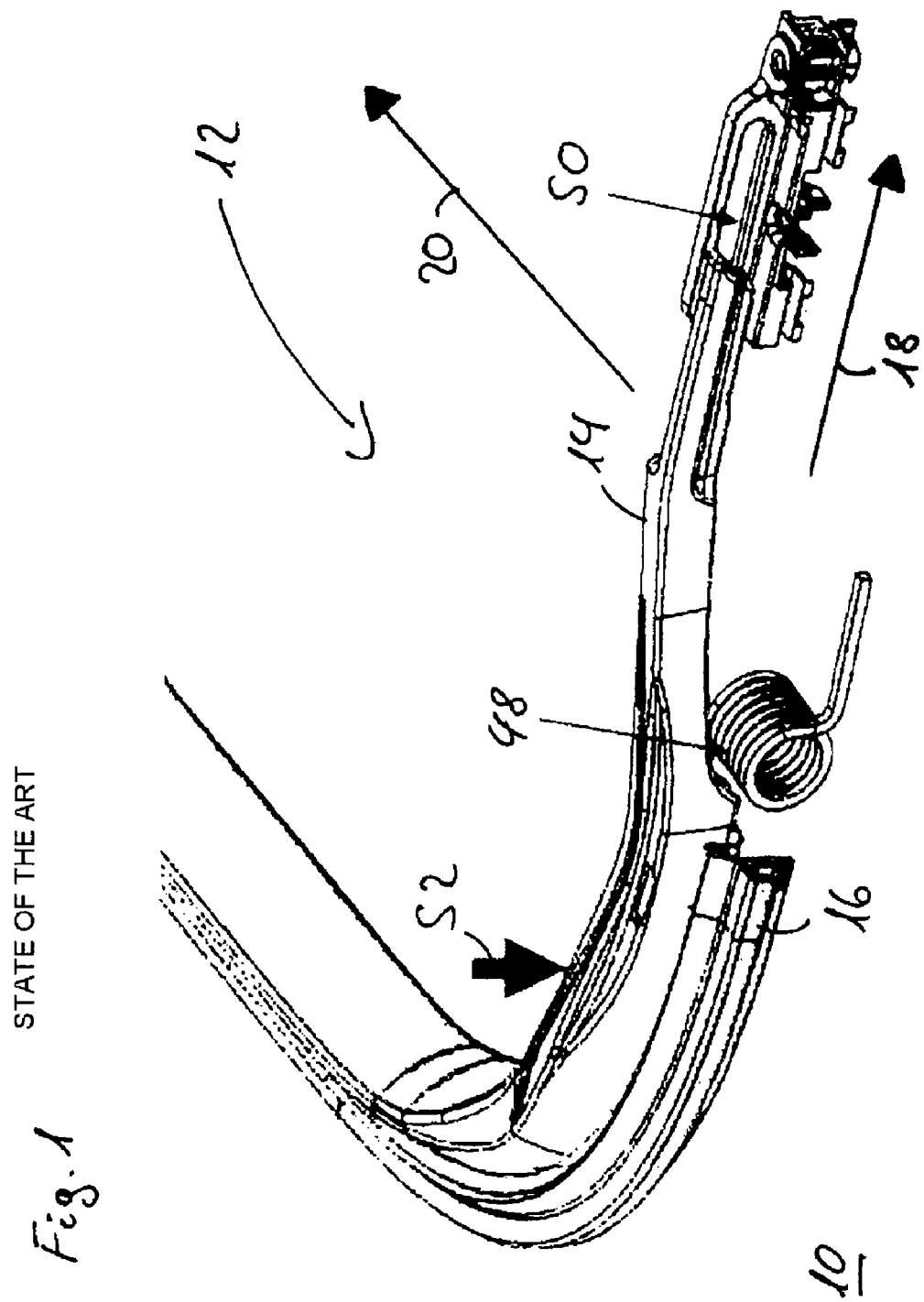
FIG. 1 shows a section of a wind deflector according to the state of the art in its rest position.
Figure 2:
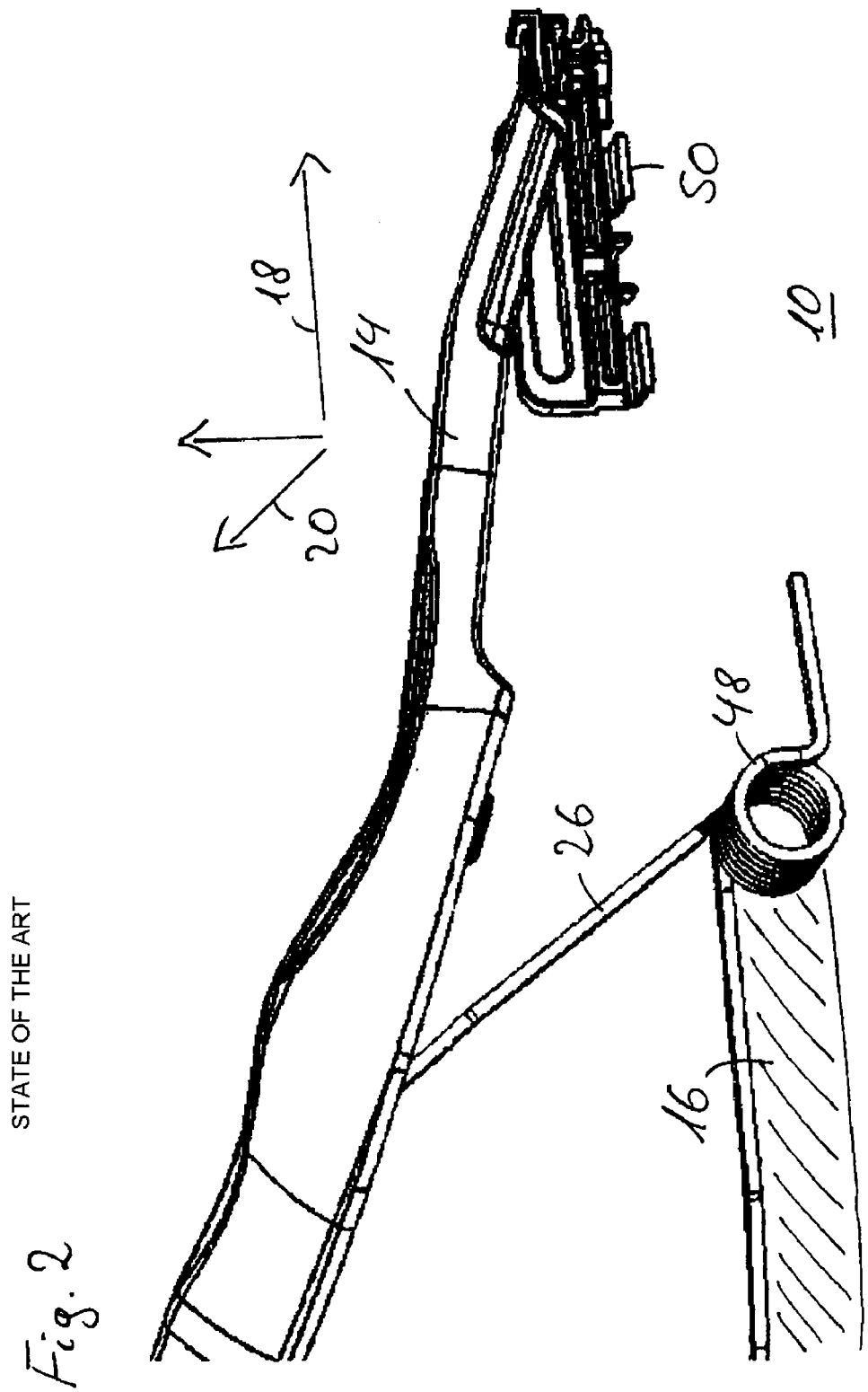
FIG. 2 shows a section of a wind deflector according to the state of the art in its active position.

FIGS. 1 and 2 illustrating a wind deflector according to the state of the art were already described.

Figure 3:
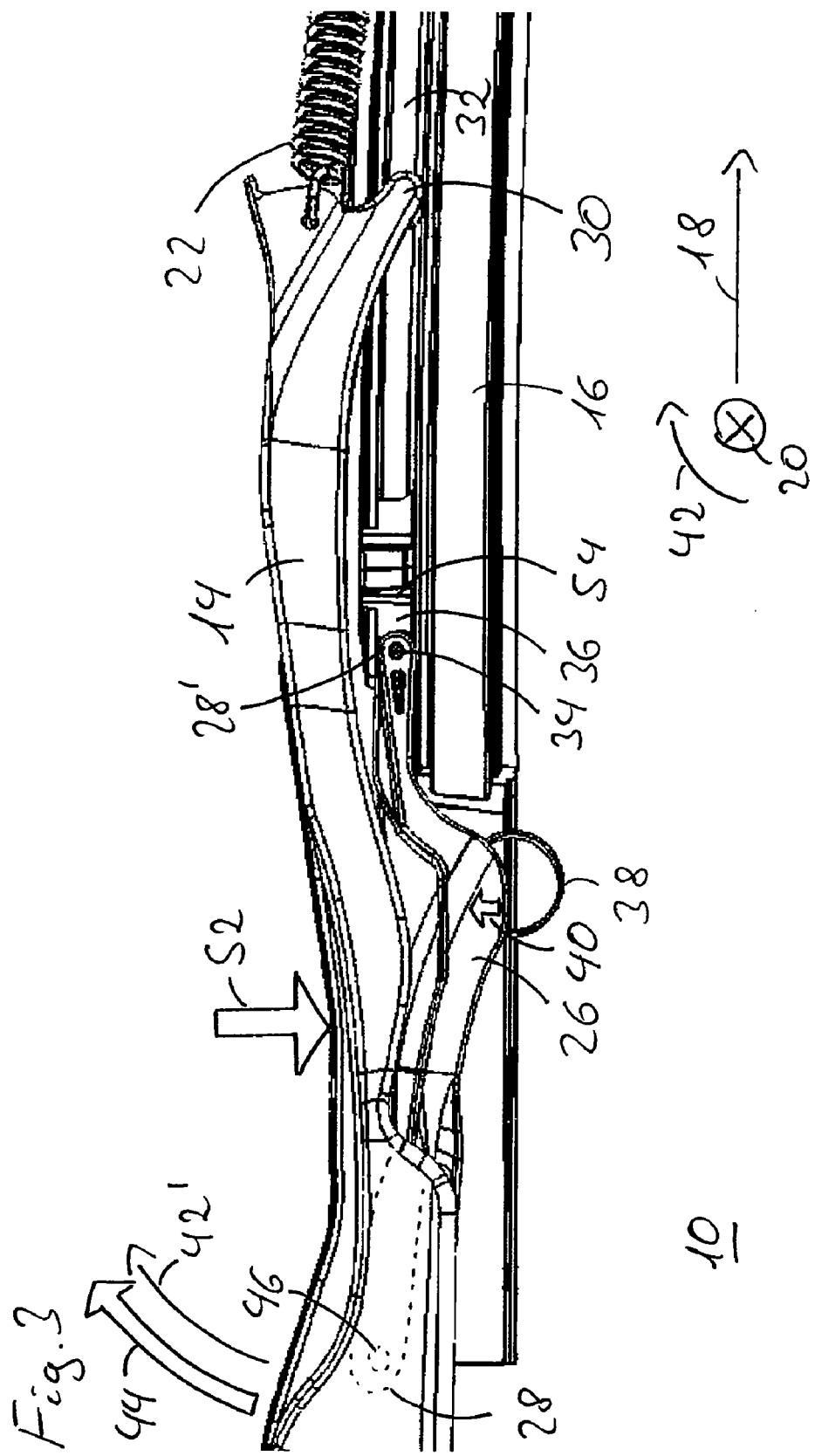
FIG. 3 shows a side view of a wind deflector according to the invention in its rest position.

FIG. 3 shows a side view of a wind deflector according to the invention in its rest position. Of the illustrated wind deflector 10, a raising mechanism according to the invention is primarily visible, i.e., a part of the wind deflector arm 14, the arm 26, an elastic element 22 formed as a tension spring, and a part of the frame 16. For reasons of symmetry, it is obvious that another, for example, identical part of the wind deflector mechanism not visible in this view is required which could be limited to the wind deflector arm and its bearing in the case of a corresponding design of the visible parts. For better orientation, the longitudinal direction 18 and, perpendicular thereto, the trans-verse direction 20 (directed into the image plane), as well as a rotational direction 42 or 42' around the transverse direction 20 are indicated. The rotation axis of the rotating direction 42' of the wind deflector arm 14 rotates around a pin 30. The illustrated wind deflector 10 comprises a wind deflector arm 14 shiftable along the frame 16 in the longitudinal direction 18 via the pin 30 in a slotted link 32 and mounted so as to be rotatable in the transverse direction 20. Further, an elastic element 22 formed as a tension spring and fixed relative to the frame 16 engages the wind deflector arm 14 and conveys a force 24 in the longitudinal direction 18 to the wind deflector arm 14. The force in the longitudinal direction 18 may, in this case, act on the wind deflector arm 14 continuously and, for example, also be constant or be kept constant. Therefore, a force in the longitudinal direction 18 also acts on the wind deflector arm in the rest position of the wind deflector 10. Force components generated by the elastic element 22 which are not directed in the longitudinal direction 18 may be absorbed by the slotted link 32 or used for raising the wind deflector arm 14. Further, the wind deflector arm 14 is supported so as to be rotatable via a bearing 46 with one end 28 of the arm 26, wherein another end 28' of the arm 26 may be supported via a further pin 34 in a further slotted link 36 comprising a stopper 54 in the longitudinal direction 18, wherein then, simultaneously, the rotatability of the arm 26 relative to the frame 16 is ensured, for example, by a rotatability about the further pin 34. Due to the movability of the arm 26 relative to the frame 16, the wind deflector arm 14 is also shiftable relative to the frame 16 in the longitudinal direction 18. Therefore, the entire wind deflector 10 may then be further shifted relative to the frame 16 in the longitudinal direction 18 in its rest position. The movability of the arm 26 in the further slotted link 36 is optional and may be omitted. In addition, the further slotted link 36 may be identical to the slotted link 32, simplifying the production of the frame 16. In this case, the stopper 54 may divide the slotted link 32 into two sections. Depending on the requirements, the slotted links 32, 36 may, for example, be formed as simple guide rails. In the illustrated rest position of the wind deflector 10, the arm 26 of the wind deflector 10 contacts a further elastic element 38 exerting a further force 40 acting against the reset force 52 on the wind deflector arm 14 and retaining the wind deflector 10 in its rest position in this manner. If the reset force 52 becomes small enough, for example, cancelled by opening a roof opening, the wind deflector 10 is moved into its active position shown in FIG. 4 from the rest position shown in FIG. 3. In the process, the wind deflector arm 14 is first pulled in the longitudinal direction 18 by the elastic element 22, wherein the wind deflector arm 14 is guided in the slotted link 32, and the arm 26 is also guided in the further slotted link 36 via the wind deflector arm 14. In the process, a rotational force 44 is generated which is capable of rotating the wind deflector arm 14 around the pin 30 in the rotational direction 42' of the wind deflector arm 14 and, at the same time, of raising it relative to the frame 16. The rotational force 44 may, for example, be generated by a corresponding configuration of the further slotted link 36 with a movement component perpendicular to the longitudinal direction 18 and the transverse direction 20 and/or by the stopper 54 or by the design of the arm 26 itself, which, during its movement in the longitudinal direction 18, abuts on a protrusion of the frame 16 and is thereby raised. The force 24 in longitudinal direction 18 generated by the elastic element 22 may also remain parallel to the longitudinal direction 18 when the wind deflector arm 14 is raised. In this way, part of the force 24 which is converted into a rotational force 44 increases with increasing erectness of the wind deflector 10 from its rest position. It is feasible that the arm 26 is formed as a spring element which additionally supports the raising of the wind deflector arm 14.

FIG. 4 shows a section of a wind deflector according to the invention in its active position. The wind deflector 10 known from FIG. 3 is shown in its active position in FIG. 4. After discontinuing the reset force 52 exerted by the elastic element 22, the wind deflector arm 14 is raised relative to the frame 16 due to the force 24 applied via the arm 26. The other end 28' of the arm 26 abuts on the stopper 54.

The features of the invention disclosed in the above description, the drawings as well as in the claims may be important for the realisation of the invention individually or in any combination.

The invention claimed is:

1. A wind deflector for a roof opening which is closable and openable by a cover in a roof panel of a vehicle, comprising a wind deflector arm which is mounted movable relative to a frame of the roof opening in a longitudinal direction and rotatable in a transverse direction wherein an elastic element fixed relative to the frame of the roof opening engages the wind deflector arm and applies a force thereon in the longitudinal direction, and an end of an assist arm is connected rotatable about the transverse direction to the wind deflector arm and an other end is mounted rotatable in the transverse direction relative the frame of the roof opening; and wherein the wind deflector arm is guided in the longitudinal direction by a pin in a slotted link.

2. The wind deflector of claim 1, wherein the assist arm is mounted movable relative to the frame also in the longitudinal direction.

3. The wind deflector of claim 2, wherein the assist arm is guided in the longitudinal direction by a further pin in a further slotted link.

4. The wind deflector of claim 3, wherein the further slotted link is identical to the slotted link.

5. The wind deflector of claim 1, wherein the elastic element is a tension spring.

6. The wind deflector of claim 1, wherein the assist arm is rigid.

7. The wind deflector of claim 1, wherein the assist arm is a spring element.

8. The wind deflector of claim 1, wherein a further elastic element is provided which only contacts the wind deflector in a rest position and, at that time, applies a further force to the wind deflector.

* * * * *